United States Patent [19] [11] 3,928,731

Cohen [45] Dec. 23, 1975

[54] REPERTORY DIALER

[75] Inventor: Herbert I. Cohen, Point Pleasant Beach, N.J.

[73] Assignee: Acron Corporation, Lakewood, N.J.

[22] Filed: May 14, 1973

[21] Appl. No.: 360,107

Related U.S. Application Data

[63] Continuation of Ser. No. 133,620, April 13, 1971.

[52] U.S. Cl. ................................ 179/90 BB; 360/45
[51] Int. Cl. ............................................ H04m 1/46
[58] Field of Search.......... 179/90 BB, 90 BD, 90 B, 179/59–65; 360/32, 45

[56] References Cited

UNITED STATES PATENTS

| | | | |
|---|---|---|---|
| 2,953,647 | 9/1960 | Johanson | 179/90 BB |
| 3,104,285 | 9/1963 | Kobler | 179/90 BD |
| 3,321,584 | 5/1967 | Lockwood | 179/90 BD |
| 3,365,549 | 1/1968 | Moseley | 179/90 BD |
| 3,371,163 | 2/1968 | Moseley | 179/90 BD |
| 3,427,406 | 2/1969 | Kuehnle | 179/90 BB |
| 3,665,485 | 8/1974 | Pear, Jr. | 360/45 |

OTHER PUBLICATIONS

Technology Survey, NASA, Magnetic Tape Recording, Jan. 1966, pp. 44–45, Athley.

*Primary Examiner*—Kathleen H. Claffy
*Assistant Examiner*—Gerald L. Brigance
*Attorney, Agent, or Firm*—Robert M. Skolnik

[57] ABSTRACT

The specification discloses a repertory dialer for recording pulse signals representing a library of desired telephone numbers and for automatically "dialing" selected ones of the library. The pulse signals are generated using a conventional dial mechanism which energizes the device and appropriately biases certain components. The recorded information is coupled to the telephone lines via a monostable multivibrator whose output is connected to a relay driver arrangement.

5 Claims, 3 Drawing Figures

REPERTORY DIALER

This is a continuation, of application Ser. No. 133,620, filed Apr. 13, 1971.

This invention relates to an electronic circuit for controlling the recording and readout of information stored on a magnetic storage device and, more particularly, to a circuit for controlling the automatic dialing of telephone numbers which have been prerecorded on magnetic storage media.

The class of devices to which this invention pertains is known as repertory dialers. A repertory dialer is a device employing a storage medium on which is recorded signal information corresponding to frequently called telephone numbers. The information is recorded under some visual designation of the individual associated with the particular telephone number. When a telephone number is to be called, the visual designation is selected and a button is depressed whereby the repertory dialer automatically transmits the proper signal information to obtain a connection with the selected telephone station.

The recording medium commonly employed in repertory dialers is of the magnetic material type. The medium may be a tape or drum arranged so that a magnetic transducer can be positioned by the user to read out the information. A variety of schemes are available to initially record the information on the storage medium as are more specifically set forth in U.S. Pat. No. 3,430,004.

The present invention provides electrical circuitry for a repertory dialer of simplified construction wherein recording of the desired telephone numbers is accomplished using a replica of the standard telephone dial. The shunt and dialing contacts of the telephone dial are connected across certain pins of a four pin plug. Insertion of the plug into respective jacks appropriately biases a magnetic transducer for recording as well as causing energization (i.e., motion) of the magnetic recording media. Information is recorded on the storage media as a series of pulses which are produced by diffrentiation of the output of the telephone dial.

After recording of the desired telephone numbers, energization of the dialer is accomplished by a push button switch after selection of the desired number. The negative portion of the pulses fire a monostable multivibrator whose output is connected to a relay driver arrangement at the telephone lines.

It is an object of the present invention to provide electronic circuitry for a repertory dialer having a simplified recording mode employing a telephone dial mechanism.

Another object of the present invention is the provision of a recording technique for a repertory dialer which utilizes only the trailing edge of differentiated dial pulse information.

Another object of the present invention is the provision of multivibrator means in a repertory dialer for reconstituting the dial pulse information from its trailing edge.

A further object of the present invention is the provision of a repertory dialer which is of simple construction.

These as well as further objects and advantages of the present invention will be apparent to those skilled in the art from a reading of the following specification reference being made to the accompanying drawings in which.

Figure 1:
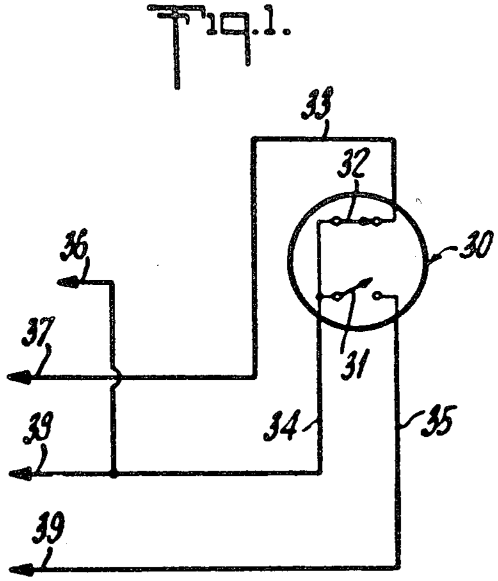
FIG. 1 is a schematic diagram of a portion of the preferred embodiment of the invention.

In the drawings, FIG. 1 depicts a conventional telephone dial mechanism 30 connected to pins 36–39 of a four pin plug assembly. More particularly, dial mechanism 30 contains shunt contacts 31 normally opened, and dialing contacts 32, normally closed. The mechanism operates such that shunt contacts 31 close prior to commencement of dialing. Dialing contacts 32 then make and break as a function of the number dialed.

Electrical wire 35 is connected between one side of shunt contacts 31 and pin 39 of the four pin connector. Pin 38 is connected to shunt contacts 31 and dialing contacts 32 via wire 34 while pin 37 is connected to the other side of dialing contacts 32 via wire 33. A fourth pin 36 is connected directly to wire 34. This fourth pin 36 is shorter in length than pins 37–39.

Figure 2:
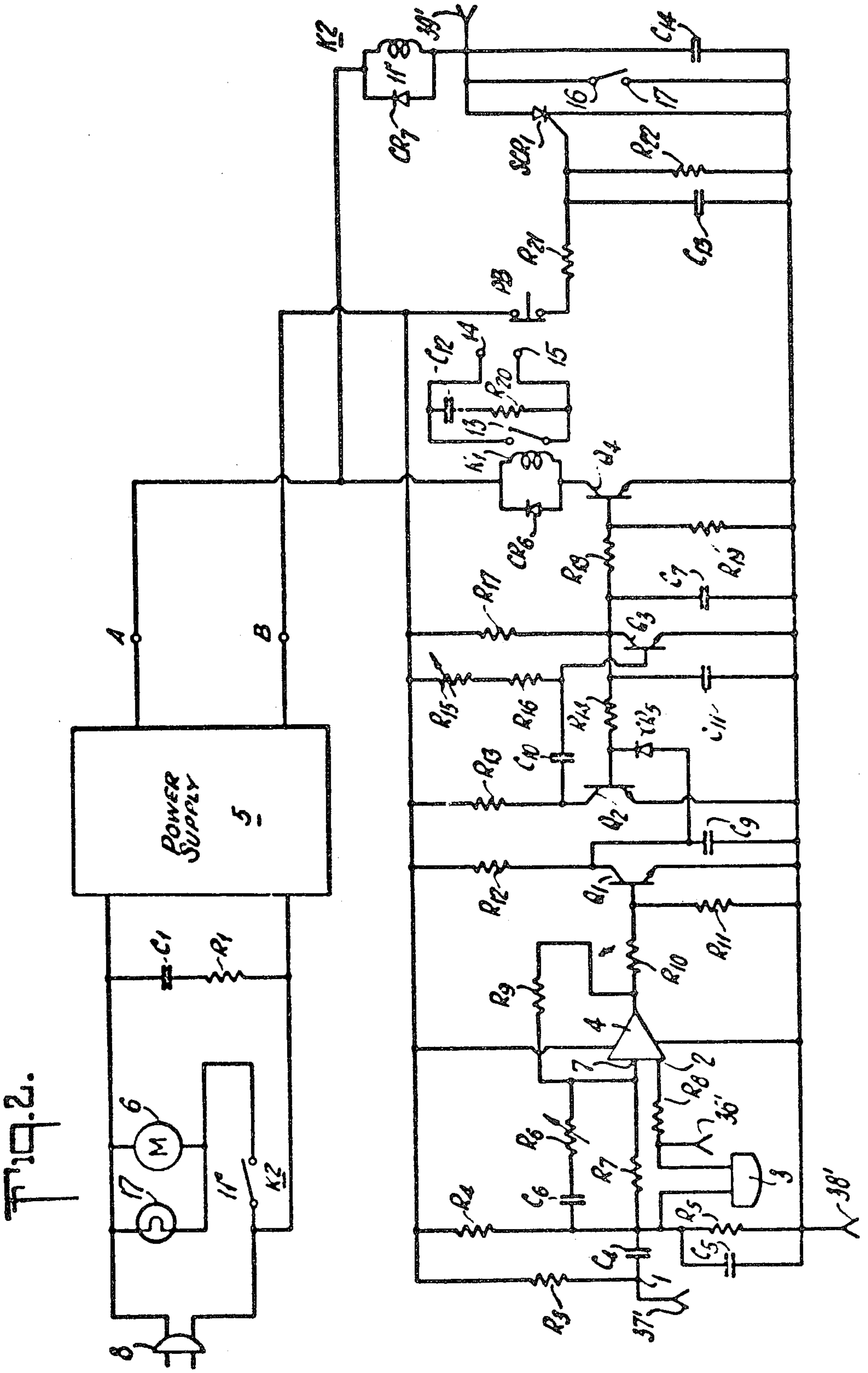
FIG. 2 is a schematic diagram of the circuitry employed in the invention.

Recording of the desired telephone numbers is accomplished utilizing the device of FIG. 1 and a portion of the circuitry shown in FIG. 2.

In FIG. 2, jacks 36′–39′ are provided corresponding respectively to the pins 36–39.

Jack 37′ is connected to magnetic recording head 3 via junction point 1 and a capacitor C4. Capacitor C4 is also connected to output B of a power supply 5. Supply 5 is designed to provide a regulated output at B, and 18± 3 volts from high to low line at output A. A resistor R4 is connected between power supply output B and capacitor C4. The negative side of capacitor C4 is also connected to point B of the supply via a resistor R3.

Jack 36′ is connected to the other side of magnetic recording head 3, and jack 39′ is connected to relay K2. Jack 38′ is connected to the most negative point of the power supply.

Numeral 2 denotes the non-inverting input of a high input impedance operational amplifier 4 which may be the conventional integrated circuit operational amplifier, manufactured by National Semiconductor under their Model Designation 301A.

As shown in the upper portion of the Figure, power for the repertory dialer is provided from a standard A.C. plug 8. Motor 6 which drives the magnetic recording medium past recording head 3 is connected to plug 8 via the moveable contacts 11 of motor control relay K2. A filter comprised of resistor R1 and capacitor C1 is connected in shunt relationship to motor 6 to protect contacts 11 and minimize inductive transients. In addition, an indicator lamp 7 is provided to produce a visual indication when motor 6 is running.

To record telephone numbers on the magnetic recording media, respective pins 36–39 of the four pin plug are inserted into jacks 36′–39′. Pins 37–39 make first while short pin 36 makes connection later. The making of pin 39 with jack 39′ has no effect on the circuit since the shunt contacts 31 of telephone dial 30 are open. The making of pin 38 with jack 38′ contacts ground to one side of the dialing and shunt contacts while the making of pin 37 with jack 37′ grounds point 1. Lastly, the making of pin 36 with jack 36′ grounds the magnetic head 3. Grounding of head 3 last prevents any current pulse which may occur by the grounding of point 1 from being recorded by head 3. More particularly, a pulse will be generated via power supply output B and resistor R3 when point 1 is grounded. Magnetic head 3, however, is ungrounded at this time so that the high input impedance of amplifier 4 prevents this pulse from being recorded. The pulse dies out prior to the grounding of head 3 via jack 36' and pin 36.

Resistors R4 and R5 act as a voltage divider to establish the operating point for the operational amplifier. Capacitor C5 is a bypass filter capacitor for resistors R4 and R5.

Grounding of head 3 causes bias current to flow through the head via supply output B and resistor R4. In practice, this current should be of sufficient magnitude to saturate the magnetic recording medium in one polarity. The illustrated embodiment of the invention is described with reference to a positive saturation bias. Prior to grounding of head 3 no appreciable bias current flows through the head 3 in view of the high input impedance of operational amplifier 4.

It will be recalled in connection with the description of FIG. 1, that shunt contacts 31 close on commencement of the dialing and remain closed until the dialing of the digit is completed. The foregoing is diagramatically shown in waveform A of FIG. 3 where the pulse indicates the duration of contact closure of shunt contacts 31. It can now be seen that, upon the closing of shunt contacts 31, a conductive path may be traced from pin 38 (and jack 38'), lead 34, shunt contacts 31, and thence to pin 39 (and jack 39') via conductor 35. This connection of jacks 38' and 39' causes current to flow through coil 11' of relay K2 thereby energizing this relay causing power to be supplied to motor 6 via the moveable contacts 11 of this relay. A diode CR7 shunts the relay coil 11' in the conventional manner to limit current surge caused by the collapse of the field in coil 11' when the relay changes state.

Figure 3:
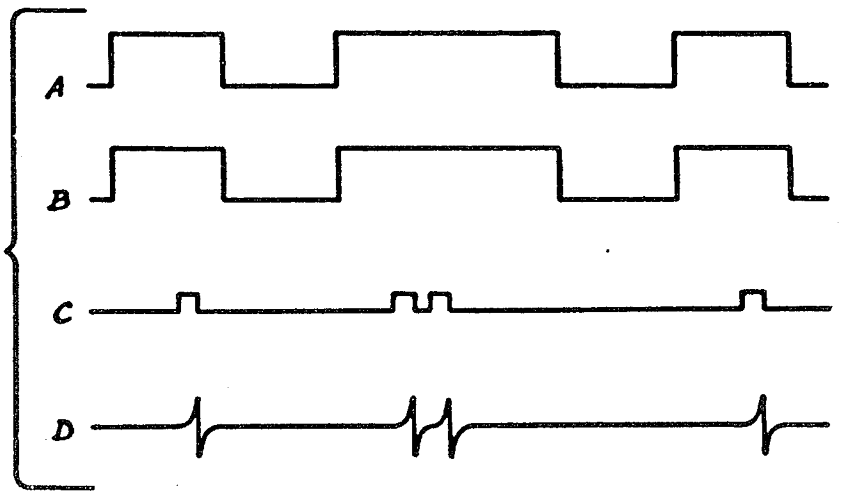
FIG. 3 is a diagram of waveforms useful in the understanding of the circuit of FIG. 2.

Motor 6 drives a suitable magnetic recording medium such as tape, disc, drum, or cylinder past the head 3 for the duration of closure of shunt contacts 31 (waveform B, FIG. 3). The dial contacts 32 then make and break to produce an output indication (waveform C) of the number dialed.

Returning to FIG. 1, opening of dial contacts 32 ungrounds the juncture of resistor R3 and capacitor C4 via pin 37 (jack 37') and lead 33 which juncture is designated by the numeral 1 in FIG. 2, causing capacitor C4 to charge and discharge towards the supply voltage B at a rate proportional to the RC time constant of resistor R3 and capacitor C4. As will be recognized by those skilled in the art, resistor R3 and capacitor C4 operating as has just been described constitute a conventional differentiating circuit producing the waveform D (FIG. 3). It will be recalled that head 3 was already biased to saturation in a positive direction by resistor R4. Thus, the positive polarity output of the diffrentiation produces no indication on the tape. The negative polarity output of the differentiator causes the current in the head to momentarily reverse direction, thereby saturating the tape in the opposite direction. In the present invention, it can be seen that the positive saturation bias serves to erase any prior information recorded on the tape.

The desired telephone numbers have thus been recorded on a magnetic recording media. Removal of the dial prepares the circuit for readout.

The structure and operation of the circuit to achieve readout of the stored phone numbers and automatic dialing thereof will now be described.

Operational amplifier 4 has its non-inverting input 2 connected to magnetic head 3 via drift correction resistor R8. The inverting input 7 is connected to certain gain adjusting elements. The D.C. gain of the amplifier is set by feedback resistor R9 and input resistor R7. As is well known, the D.C. gain of an operational amplifier is equal to the input voltage multiplied by the ratio of the sum of the feedback resistors to the sum of the input resistors. A.C. gain adjustment is provided by adjustable resistor R6 and capacitor C6, connected in series thereto. The D.C. gain is set low to provide low output drift due to input offset voltage, input bias and offset bias. The A.C. gain is set high to achieve the necessary gain for amplification.

Information pulses developed by head 3 are thus amplified by amplifier 4 and fed to the base of a transistor Q1 which serves as a threshold detector. More particularly, the base of transistor Q1 is connected to the output of amplifier 4 via a threshold setting voltage divider consisting of resistors R10 and R11. Transistor Q1 is biased at its normally conducting state so that the negative polarity output pulse from amplifier 4 renders Q1 non-conducting. The collector of transistor Q1 is connected to the B output of power supply 5 via a collector load resistor R12.

The collector of transistor Q1 is coupled to the base of another transistor Q2 via series connected diode CR5 and shunt capacitor C9. As will be described in more detail later, transistors Q2 and Q3 form part of a well known monostable multivibrator circuit. Capacitor C9 prevents transients from falsely triggering the multivibrator by slowing the turn off of transistor Q1. More particularly, resistor R12 in combination with capacitor C9 constitute an integrating circuit which requires that a pulse of at least some minimum duration appear at the base of transistor Q2 before Q2 will turn on.

Diode CR5 isolates the monostable multivibrator from threshold detector Q1 and also provides current to the base of transistor Q2 via resistor R12. The monostable consists of transistors Q2 and Q3, resistor R13 (the collector load for transistor Q2); resistor R17 (the collector load for transistor Q3); resistors R14-16; and capacitor C10. Each of these elements operate in the manner well known to those skilled in the art and no further description is provided herein.

The output of the monostable is connected to a relay driver consisting of normally nonconducting transistor Q4 and a biasing voltage divider consisting of resistors R18 and R19 via capacitor C7. Capacitor C7 prevents transients from triggering the multivibrator. The collector load for transistor Q4 is the coil of a relay k1 shunted by a surge suppressing diode CR6. The output of the monostable multivibrator renders transistor Q4 conductive thereby energizing relay K1 for the duration of the multivibrator output. Relay K1 has its moveable contact 13 connected directly to the telephone lines via output terminals 14 and 15. A filter consisting of capacitor C12 and resistor R20 protects contacts 13. The readout circuitry therefore described automatically dials the telephone number stored on the magnetic storage media by energizing relay K1 via a monostable multivibrator. The monostable is triggered by the appearance of a pulse at the output of the amplifier 4.

No mention has yet been made of two important features of any repertory dialer: the indexing to locate the desired phone number; and the stopping of the system after the desired number has been dialed. In a co-pending application of Silsby, Ser. No. 133,620 filed Apr. 13, 1974 now U.S. Pat. No. 3,720,795, issued Mar. 13, 1973 commonly assigned, there is disclosed magnetic recording cylinder having a record and playback head which is slidably mounted with respect to the cylinder. Each track of the cylinder is thus located simply by manually sliding the head to a point adjacent the desired track.

In a co-pending application of applicant Ser. No. 64,758 filed Aug. 18, 1970 there is shown a tape sense system employing electrically conductive material on a magnetic recording medium in combination with a specially modified magnetic recording head which, upon sensing of the conductive material by the modified head, drives the magnetic recording medium until the electrically conductive material passes beneath the head and then stops the system.

Similar circuitry is provided in the present invention, the difference being the sensing foil is replaced by a cam and the tape sense switch replaced by a micro-switch. More particularly, after all information has been recorded, the magnetic head is manually positioned adjacent the desired track as taught in the aforementioned co-pending application of Silsby.

Push button switch PB (FIG. 2) is then momentarily depressed by the operator. The closing of this switch is seen to latch a silicon controlled rectifier SCR1 via a bias resistor R21 and the gate element of SCR1. Capacitors C13 and C14 prevent the SCR from false latching and triggering. Resistor R22 provides bias for the SCR in the non-conductive state.

Latching of the SCR provides a conductive path between relay K2 and ground via the anode and cathode elements SCR thus energizing this relay thereby causing motor 6 to run.

With motor 6 running, the magnetic recording media is then passing beneath head 3. A reference point is provided by the micro-switch shown at numerals 16 and 17.

When the cam on the magnetic recording cylinder closes the micro-switch, a conductive path is established short circuiting the anode and cathode of SCR1 thereby rendering this element non-conductive but also providing a circuit path to ground for relay K2 keeping this relay and consequently motor 6 energized until the micro-switch is again on open circuit. In this manner a "home" position for the magnetic recording media is established just subsequent to the location of the cam on the cylinder.

I claim:

1. An electronic circuit for recording electrical signals representing telephone number information and subsequently for controlling the energization of relay means as a function of said electrical signals, said circuit comprising:

dial means for generating electrical signals representing telephone number information;

magnetic head means for recording said electrical signals, means connected to said magnetic head an to said dial means for differentiating said electrical signals and for recording said differentiated electrical signals;

amplifier means connected to said magnetic head means for amplifying said recorded electrical signals;

transistor means including resistor-capacitor control means therefor, connected to the output of said amplifier means for blocking the output of said amplifier means unless such output exceeds a predetermined amplitude determined by said transistor means, and time duration determined by said resistor-capacitor means;

monostable multivibrator means connected to said transistor means for producing a pulse type output signal as a function of the output of said transistor means; and relay driver means including relay means connected to said multivibrator means for controlling the connecting and disconnecting of said relay means as a function of said pulse type signal.

2. In a device for automatically dialing prerecorded telephone numbers, the combination for generating said telephone number information comprising:

telephone dial means including: dialing contacts for producing a pulse type electrical signal of a first frequency representing telephone number information and shunt contacts for producing motor control signals;

differentiator means connected to said telephone dial means for differentiating said pulse type signal;

magnetic head means connected to said differentiator means for recording said differentiated electrical signal;

an electrical motor;

relay means connected to said motor for controlling the energizing of said motor in response to said motor control signals; and electrical connector means having a number of connection points for connecting said dial means to said magnetic head and to said relay means, said electrical connector including at least one connection point, connected to said magnetic head, which makes connection after the other of said connection points for preventing the recording of undesired error pulses by controlling the sequence of connection in said device.

3. An electronic circuit for recording and reading a plurality of pulse type electrical signals representing telephone number information comprising:

magnetic head means for recording and reading pulse type electrical signals representing telephone numbers;

telephone dial means for generating output signals representing telephone numbers;

differentiator means connected between said telephone dial means and said magnetic head means for differentiating said output signals to produce said pulse type electrical signals;

amplifier means connected to said magnetic head means for amplifying said pulse type signals;

transistor means including resistor-capacitor control means therefor connected to the output of said amplifier means for blocking the output of said amplifier means unless such output exceeds a predetermined amplitude determined by said transistor means and time duration determined by said resistor-capacitor means;

monostable multivibrator means connected to said transistor means for producing relay control signals as a function of said pulse type signals;

output means;

relay means connected to said monostable multivibrator means and to said output means for grounding and ungrounding said output means as a function of said control signals; and pin type electrical connector means connected to said telephone dial means for enabling the connection of said dial means, said connector having at least one pin whose length is shorter than the remaining pins; and jack type electrical connector means connected to said magnetic head means for grounding said magnetic head via said short pin after engagement of said first and second electrical connectors to prevent the recording of error pulses by said head means.

4. The circuit of claim 3 further including:

an electrical motor;

second relay means connected to said electrical motor for controlling the energization thereof; and means, connected to said second relay means for causing said relay means to energize said motor upon the generation of said output signals.

5. The circuit of claim 4 further including push button switch means connected to said second relay means for causing said second relay means to energize said motor.

* * * * *